(12) United States Patent
Honma et al.

(10) Patent No.: US 7,657,412 B2
(45) Date of Patent: Feb. 2, 2010

(54) METHOD OF AND APPARATUS FOR DISPLAYING STRUCTURE OPTIMIZING RESULT

(75) Inventors: Hideki Honma, Saitama (JP); Nobu Sasaki, Saitama (JP); Mijo Itoh, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1325 days.

(21) Appl. No.: 10/102,831

(22) Filed: Mar. 22, 2002

(65) Prior Publication Data

US 2002/0161730 A1 Oct. 31, 2002

(30) Foreign Application Priority Data

| Mar. 29, 2001 | (JP) | ............................ 2001-094904 |
| Mar. 29, 2001 | (JP) | ............................ 2001-094906 |
| Mar. 29, 2001 | (JP) | ............................ 2001-094912 |

(51) Int. Cl.
*G06G 7/48* (2006.01)

(52) U.S. Cl. .................................... 703/8; 703/1; 703/6

(58) Field of Classification Search ..................... 703/2, 703/1, 6–8; 706/19; 700/173; 707/10, 102, 707/1, 205; 711/114
See application file for complete search history.

(56) References Cited

U.S. PATENT DOCUMENTS

| 5,729,463 | A | * | 3/1998 | Koenig et al. ................. 700/98 |
| 5,754,181 | A | * | 5/1998 | Amdursky et al. .......... 345/419 |
| 5,867,397 | A | * | 2/1999 | Koza et al. ................... 703/14 |
| 5,926,399 | A | * | 7/1999 | Berkooz et al. ................ 703/7 |

(Continued)

FOREIGN PATENT DOCUMENTS

JP 7-109383 11/1995

OTHER PUBLICATIONS

"Topology optimization of beam cross sections" by Yoon Young Kim and Tae Soo Kim, International Journal of Solids and Structures, @Dec. 1998.*

(Continued)

*Primary Examiner*—Paul Dinh
*Assistant Examiner*—Nha T Nguyen
(74) *Attorney, Agent, or Firm*—Birch, Stewart, Kolasch & Birch, LLP (57) ABSTRACT

To provide a method of and an apparatus for displaying a structure optimizing result which are capable of displaying rigidity values calculated on the basis of an initial wall thickness value, an optimum wall thickness value, and a standard wall thickness value in such a manner that a change between two of these rigidity values is clearly indicated. The structure optimizing result is displayed wherein an actual rigidity value of a structure is calculated on the basis of an inputted initial value of a wall thickness of each component of the structure. An optimum value of the wall thickness of each of the components is calculated on the basis of a sensitivity analysis result in order to make the calculated actual rigidity value close to a required rigidity value of the structure and the calculated result is displayed. In the method and apparatus, the actual rigidity value and a rigidity value of the structure on the basis of the optimum wall thickness value of each of the component are comparatively displayed as a list by an output calculation/display control unit.

21 Claims, 5 Drawing Sheets

U.S. PATENT DOCUMENTS

| | | | | |
|---|---|---|---|---|
| 6,026,397 | A * | 2/2000 | Sheppard | 707/5 |
| 6,032,106 | A * | 2/2000 | Ishii | 702/85 |
| 6,081,654 | A * | 6/2000 | Morman et al. | 703/1 |
| 6,092,062 | A * | 7/2000 | Lohman et al. | 707/2 |
| 6,132,108 | A * | 10/2000 | Kashiwamura et al. | 703/2 |
| 6,272,449 | B1 * | 8/2001 | Passera | 703/2 |
| 6,411,945 | B1 * | 6/2002 | Nakajima | 706/19 |
| 6,557,002 | B1 * | 4/2003 | Fujieda et al. | 707/102 |
| 6,633,836 | B1 * | 10/2003 | Yamaura | 703/2 |
| 2001/0026289 | A1 * | 10/2001 | Sugiyama et al. | 345/804 |

OTHER PUBLICATIONS

"Introduction to Microsoft Excel 2000", University North Texas, @Jun. 1999.*

Lee T H et al: "Topology optimization of the inner reinforcement for an automobile hood using modal design sensitivity analysis" Key Engineering Materials Trans Tech Publications Switzerland, vol. 183-187, 2000, pp. 439-444, XP008056156.

Yoon Young Kim et al: "Topology optimization of beam cross sections" International Journal of Solids and Structures Elsevier UK, vol. 37, No. 3, Jan. 2000 pp. 477-493, XP002355463 ISSN: 0020-7683.

Oda Juhachi et al: "Minimum compliance technique for shell structures (plate thickness variance approach and its applications)" Nippon Kikai Gakkai Ronbunshu a Hen; Nippon Kikai Gakkai Ronbunshu, a Hen/Transactions of the Japan Society of Mechanical Engineers, Part A Apr. 1991, vol. 57, No. 536, pp. 1005-1010, XP008056160.

* cited by examiner

| | UNIT | A<br>VALUE FOR INITIAL WALL THICKNESS | B<br>REQUIRED VALUE | C<br>VALUE FOR OPTIMUM WALL THICKNESS | D<br>VALUE FOR STANDARD WALL THICKNESS | B-A | C-B | C-D | C-A | D-B | D-A |
|---|---|---|---|---|---|---|---|---|---|---|---|
| LATERAL RIGIDITY VALUE | kgf/mm | 10 | 20 | 21 | 22 | 10 | 1 | -1 | 11 | 2 | 12 |
| TORSIONAL RIGIDITY VALUE | kgf/rad | 2000 | 2500 | 2600 | 2700 | 500 | 100 | -100 | 600 | 200 | 700 |
| CENTER OF TORSION | mm | 100 | 300 | 290 | 310 | 200 | -10 | -20 | 190 | 10 | 210 |
| LATERAL DISPLACEMENT OF AXLE | mm | 10 | - | 12 | 13 | - | - | -1 | 2 | - | 3 |
| WEIGHT | kg | 10 | - | 12 | 13 | - | - | -1 | 2 | - | 3 |

FIG.5

METHOD OF AND APPARATUS FOR DISPLAYING STRUCTURE OPTIMIZING RESULT

CROSS-REFERENCE TO RELATED APPLICATIONS

The present application claims priority under 35 USC 119 to Japanese Patent Application Nos. 2001-094906, 2001-094904 and 2001-094912 all filed on Mar. 29, 2001 the entire contents thereof is hereby incorporated by reference.

BACKGROUND OF THE INVENTION

1. Field of the Invention

The present invention relates to a method of and an apparatus for displaying a structure optimizing result, which are adapted to display a result for optimizing a structure composed of a plurality of components by sensitivity analysis.

2. Description of Background Art

A structure optimization analyzing apparatus has been known, for example, from Japanese Patent Publication No. Hei 7-109383. In this apparatus, a suitable condition is calculated on the basis of a sensitivity analysis result, a condition close to the calculated result is selected on the basis of a standard database, structure analysis is performed on the basis of the selected result. A condition close to the target condition is taken as an optimum condition on the basis of the analysis result.

In the case of optimizing a rigidity balance of a structure on the basis of the above-described method, an optimum wall thickness value of each component obtained for realizing a rigidity balance under an ideally required specification may be often different from a standard wall thickness value of an actual material of each component. Accordingly, the rigidity balance of the structure is required to be obtained by changing the optimum wall thickness value of each component to a standard wall thickness value closest to the optimum wall thickness value, and recalculating the rigidity balance of the structure on the basis of the standard wall thickness value.

The above-described related art method, however, has a problem. A rigidity value calculated on the basis of an optimum wall thickness value of each of components of a structure is not perfectly equal to a rigidity value calculated on the basis of a standard wall thickness value close to the optimum value. According to the related art method, however, the method fails to determine how much deviation exists between the rigidity calculated on the basis of a standard wall thickness value and the rigidity value under a required specification.

Sensitivity analysis has been performed for the whole of a structure on the basis of the above-described method, and the analysis results, for example, a displacement amount corresponding to a rigidity of each component of the structure or an optimum wall thickness value of each component for a predetermined stress have been schematically displayed or three-dimensionally displayed, for example, by using coloring display, whereby the structure has been displayed on a display screen in the simple, visual form.

The displacement amount corresponding to a rigidity of each component, an optimum wall thickness value, and the like have been often displayed for each component as a list.

SUMMARY AND OBJECTS OF THE INVENTION

In view of the foregoing, the present invention has been made, and an object of the present invention is to provide a method of and an apparatus for displaying a structure optimizing result, which are capable of displaying rigidity values calculated on the basis of an initial wall thickness value, an optimum wall thickness value, and a standard wall thickness value in such a manner that a change between two of these rigidity values is clearly indicated.

According to the present invention, a structure is provided for optimizing the result displaying method and a structure optimizing result displaying apparatus, in which an actual rigidity value of a structure is calculated on the basis of an inputted initial value of a wall thickness of each of components of the structure. An optimum value of the wall thickness of each of the components is calculated on the basis of a sensitivity analysis result in order to make the calculated actual rigidity value close to a required rigidity value of the structure and the calculated result is displayed. In the method and apparatus of the present invention, the actual rigidity value and a rigidity value of the structure on the basis of the optimum wall thickness value of each of the component are comparatively displayed as a list.

According to the structure optimizing result displaying method and the structure optimizing result displaying apparatus according to the present invention, since the actual rigidity value and the rigidity value of the structure on the basis of the optimum wall thickness value of each of the components are comparatively displayed as a list, it can be easily appreciated, from the displayed list, to what degree the actual rigidity value deviates from the rigidity value on the basis of the optimum wall thickness value. As a result, it can be quickly decided whether a structure can be optimized only by changing a wall thickness value of each component or by changing the configuration of the structure.

In the structure optimizing result displaying method and the structure optimizing result displaying apparatus according to the present invention, a difference in the rigidity value between the actual rigidity value and the rigidity value of the structure on the basis of the optimum wall thickness value of each of the components may be obtained. The calculated difference rigidity value for each of the components be displayed as a list.

With this configuration, from the displayed list of a difference in the rigidity value between the actual rigidity value and the rigidity value of the structure on the basis of the optimum wall thickness value, it can be easily appreciated to what degree the actual rigidity value is deviated from the rigidity value on the basis of the optimum wall thickness value. As a result, it can be quickly decided whether a structure can be optimized only by changing a wall thickness value of each component or by changing the configuration of the structure.

According to the present invention, a structure is provided for optimizing the result displaying method and a structure optimizing result displaying apparatus, in which an actual rigidity value of a structure is calculated on the basis of an inputted initial value of a wall thickness value of each of components of the structure. An optimum value of the wall thickness value of each of the components is calculated on the basis of a sensitivity analysis result in order to make the calculated actual rigidity value close to a required rigidity value of the structure and the calculated result is displayed. In the method and apparatus of the present invention, a standard wall thickness value corresponding to the optimum wall thickness value optimized by the optimizing calculation is selected for each of the components. The wall thickness value of each of the components of the structure is set to the selected standard wall thickness value and a rigidity value of the structure is calculated on the basis of the selected standard wall thickness value. In addition, the rigidity value of the structure on the basis of the selected standard wall thickness value and a rigidity value of the structure on the basis of the optimum wall thickness value are comparatively displayed for each of the components as a list.

According to the structure optimizing result displaying method and the structure optimizing result displaying apparatus according to the present invention, since the rigidity value of the structure on the basis of the optimum wall thickness value and the rigidity value of the structure on the basis of the standard wall thickness value are comparatively displayed for each of the components as a list, it can be easily appreciated, from the displayed list, to what degree the rigidity value on the basis of the standard wall thickness value deviates from the rigidity value on the basis of the optimum wall thickness value. As a result, it can be quickly decided whether a structure can be optimized only by changing a wall thickness of each component or by changing the configuration of the structure.

In the structure optimizing result displaying method and the structure optimizing result displaying apparatus according to the present invention, a difference in the rigidity value between the rigidity value of the structure on the basis of the optimum wall thickness value and the rigidity value of the structure on the basis of the standard wall thickness value may be calculated and the difference in the rigidity value for each of the components is displayed as a list.

With this configuration, since a difference in the rigidity value between the rigidity value of the structure on the basis of the optimum wall thickness value and the rigidity value of the structure on the basis of the standard wall thickness value is calculated and the difference in the rigidity value for each of the components is displayed as a list, it can be easily appreciated, from the displayed list, to what degree the rigidity value on the basis of the standard wall thickness value deviates from the rigidity value on the basis of the optimum wall thickness value. As a result, it can be quickly decided whether a structure can be optimized only by changing a wall thickness value of each component or by changing the configuration of the structure.

The above-described method, however, has inconveniences. A detailed displacement amount has been not easy to be confirmed only by the display of the three-dimensional shape. On the other hand, a positional relationship between each component in the display list and the corresponding component in the three-dimensional shape is not easy to be understood only by the displayed list. Such inconveniences become significant as the number of components becomes large.

According to the above-described method, it is not easy to confirm that, of all of the components of the structure, which component should be changed, and also not easy to confirm the degree of drawing data for each component to be changed and the step required for changing the component.

In view of the foregoing, the present invention has been made, and an object of the present invention is to provide a method of and an apparatus for displaying a structure optimizing result, wherein when a wall thickness value of each component of a structure is set to a standard value of a material at the time of optimizing a rigidity balance of the structure, it can be easily, visually confirmed how much deviation between the standard wall thickness value and the wall thickness value before analysis occurs for a component of the structure. In addition, the location can be easily decided relative to the position of the three-dimensional shape of the structure each component.

In these method and apparatus, a difference value between the initial wall thickness value and the optimum wall thickness value obtained by the optimizing calculation is calculated for each of the components; the calculated difference value for each of the components is displayed as a list on one side portion of display means; a three-dimensional shape of the structure is displayed on the other side portion of the display means; and each component is displayed in such a manner that if either a component in the display list or a component in the three-dimensional shape of the structure is indicated on a screen of the display means, the indicated component is selectively displayed in the displayed list with the three-dimensional shape of the structure.

According to the structure optimizing result displaying method and the structure optimizing result displaying apparatus according to the present invention, the difference between the initial wall thickness value and the optimum wall thickness value is calculated for each component, and the calculated value is displayed for each component as a list on one side portion of the display means and the three-dimensional shape of the structure is displayed on the other side portion of the display means. If either a component in the displayed list or a component in the displayed three-dimensional shape of the structure is indicated on the screen of the display means, the indicated component is selectively displayed on the displayed list with the displayed three-dimensional shape of the structure.

Accordingly, if a component in the displayed list is indicated on the screen of the display means, the indicated component is selectively displayed in the displayed three-dimensional shape of the structure. On the other hand, if a component in the displayed three-dimensional shape of the structure is indicated on the screen of the display means, the indicated component is selectively displayed in the displayed list. Accordingly, even if the structure is complicated and/or the number of the components is large, an arbitrary component can be easily confirmed for the displacement amount before and after optimizing calculation by an operator.

In the structure optimizing result displaying method and the structure optimizing apparatus according to the present invention, a standard wall thickness value corresponding to the optimum wall thickness value may be selected for each of the components. A difference in the value between the optimum wall thickness value and the selected standard wall thickness value is calculated for each of the components and the calculated difference value for each of the components is displayed as a list in addition to the displayed list.

With this configuration, there can be obtained the following effect. In the case of actually producing each component, a wall thickness value of the component optimized for realizing a desired rigidity balance may be often replaced with a standard value of a material of the component. Accordingly, a difference occurs between the optimum value and the selected standard wall thickness value, with a result that the rigidity balance of the structure may be changed. In this case, according to the present invention, it can be easily confirmed how much change in rigidity balance occurs at which component of the structure by the display list.

In addition to the above, the related art method also has the following problem. An initial wall thickness value given for each of components of a structure, an optimum wall thickness value of each of the components of the structure and a standard wall thickness value close to the optimum wall thickness value are not perfectly equal to each other. According to the related art method, however, it fails to determine how much deviation occurs, at which portion of the structure, between two of the initial wall thickness value, the optimum wall thickness value, and the standard wall thickness value.

In view of the foregoing, the present invention has an object to provide a method of and an apparatus for displaying a structure optimizing result, which are capable of displaying an initial wall thickness value, an optimum wall thickness value, and a standard wall thickness value in such a manner that it can be easily appreciated at which portion of a structure a deviation occurs between two of the initial wall thickness value, the optimum wall thickness value, and the standard wall thickness value.

As a result, if a difference between the initial wall thickness value and the optimum wall thickness value is relatively small, it can be readily examined whether or not the structure can be optimized by changing the wall thickness value of each component of the structure, and if the number of components in each of which a difference occurs between the initial wall thickness value and the optimum wall thickness value is large or the difference between the initial wall thickness value and the optimum wall thickness value is relatively large, it can be readily examined whether or not the overall structure should be reviewed and/or a reinforcing member should be added.

With this configuration, since a difference value between the optimum wall thickness value and the selected standard wall thickness value is calculated for each of the components, and the calculated difference value is displayed for each of the components as a list, it can be easily decided how much of a difference between the optimum wall thickness value and the standard wall thickness value occurs at a component of the structure.

In the case of actually producing each component, a wall thickness value of the component optimized for realizing a desired rigidity balance may be often replaced with a standard wall thickness value of a material of the component. However, since a difference occurs between the optimum wall thickness value and the standard wall thickness value, the rigidity balance of the structure may be changed. In this case, according to the present invention, it can be easily confirmed how much of a change in rigidity balance occurs at which component of the structure by the display list.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a method of and an apparatus for displaying a structure optimizing result according to the present invention will be described with reference to an embodiment.

Figure 1:
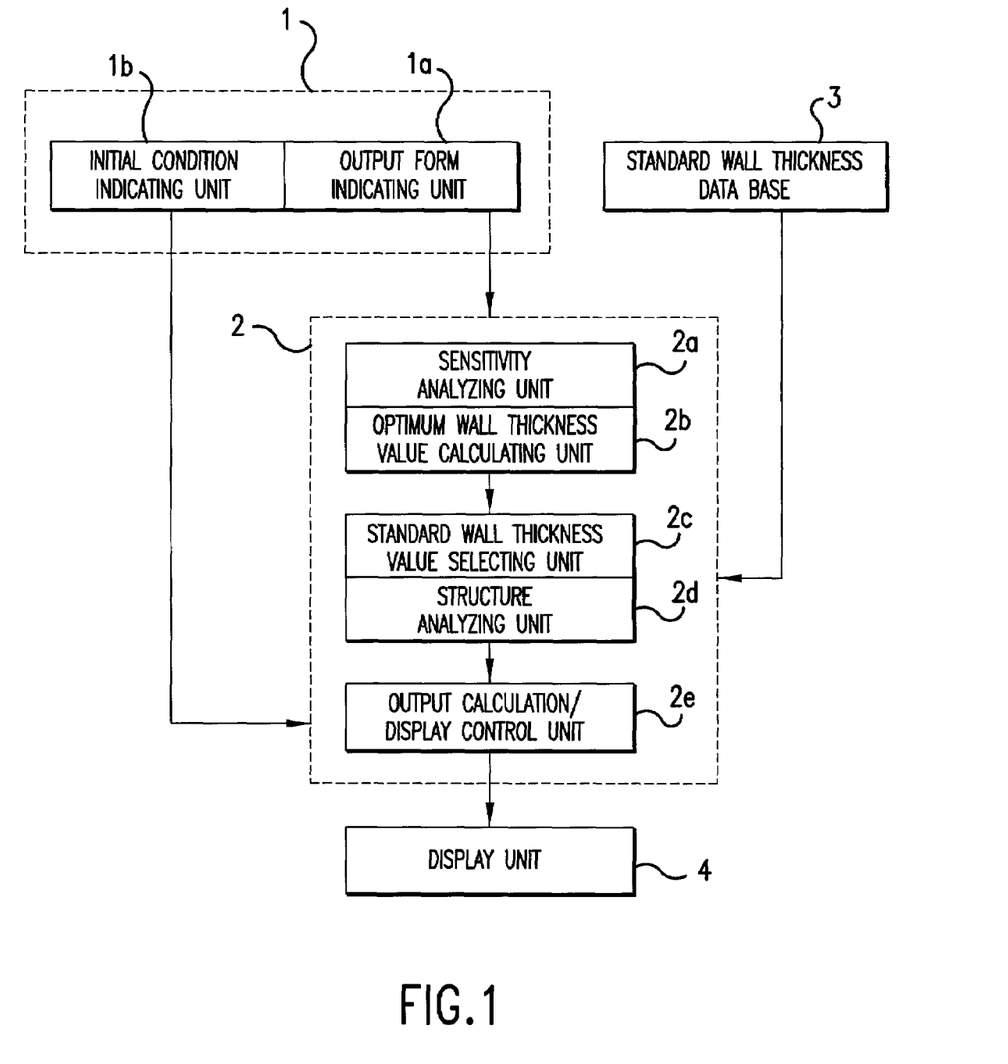
FIG. 1 is a block diagram showing a configuration of a structure optimizing result displaying apparatus according to one embodiment of the present invention.

FIG. 1 is a block diagram showing a configuration of a structure optimizing result displaying apparatus to which a structure optimizing result displaying method according to the embodiment of the present invention is applied.

The structure optimizing result displaying apparatus 10 in FIG. 1, will be described by way of an example in which the apparatus 10 is applied to a frame body 40 for a motorcycle shown in FIG. 4(b).

The frame body as a structure will be first described. As shown in FIG. 4(b), the frame body 40 for a motorcycle is a structure obtained by integrating a main frame 41 having a head pipe 45 with a sub-frame 42. The structure is disassembled into simple structural members taken as components. In other words, the components are integrally joined to each other, to form the structure.

The main frame 41 is disassembled into the head pipe 45 and a plurality of other structural members 46a, 46b, 47a, 47b, 48, 49a, 49b, 50, 51, 52, and the like and the sub-frame 42 is disassembled into a plurality of structural members 55a, 55b, 56, 57, 58a, 58b, 59a, 59b, etc.

Each of the structural members 46a and 46b of the main frame 41 is typically formed into a box having a pentagonal column shape in cross-section, wherein a reinforcing plate for reinforcement is provided in the box-shaped member. In a sensitivity analysis and a component analysis to be described later, a plate material forms a portion, located on one side with respect to the reinforcing plate, of the pentagonal column, the reinforcing plate, and a plate material forms the other portion, located on the other side with respect to the reinforcing plate of the pentagonal column. All of the portions are taken as independent components. The same is true for the other structural members. Accordingly, the frame body 40 includes components (not shown in the figure) other than those described above. The components of the frame body 40 are designated by component numbers (PNos.) in a table shown in FIG. 4(a).

It is to be noted that a thickness of a component should be expressed by a plate thickness if the component is formed into a plate, and should be expressed by a wall thickness if the component is formed into a pipe. However, in this disclosure, a thickness of a component is also expressed by a wall thickness even if the component is formed into a plate.

Figure 4A:
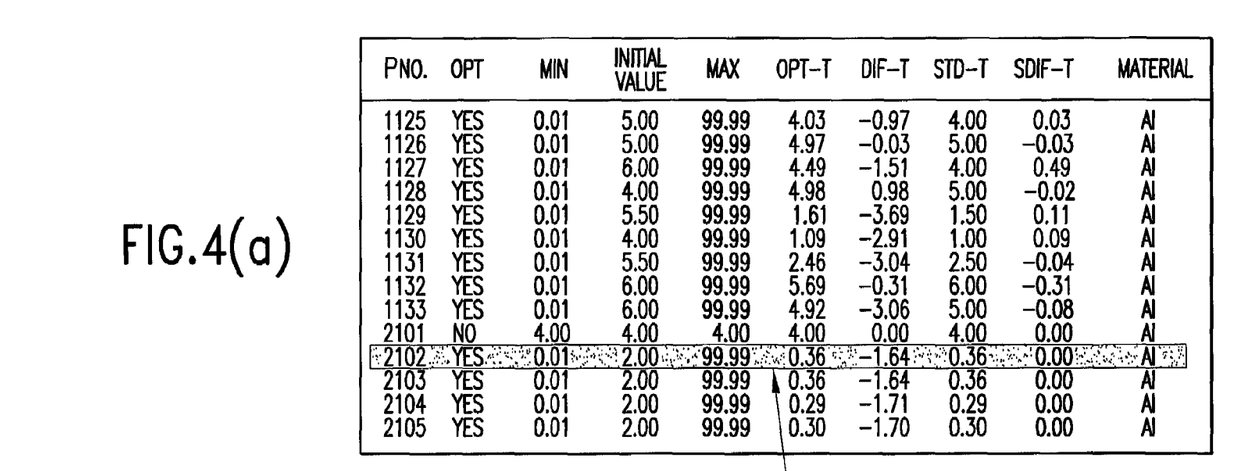
FIGS. 4(a) and 4(b) show one example of a displayed list of wall thickness values and one example of a displayed three-dimensional shape of a structure, which are obtained by the structure optimizing result displaying apparatus according to the embodiment of the present invention, respectively.
Figure 4B:
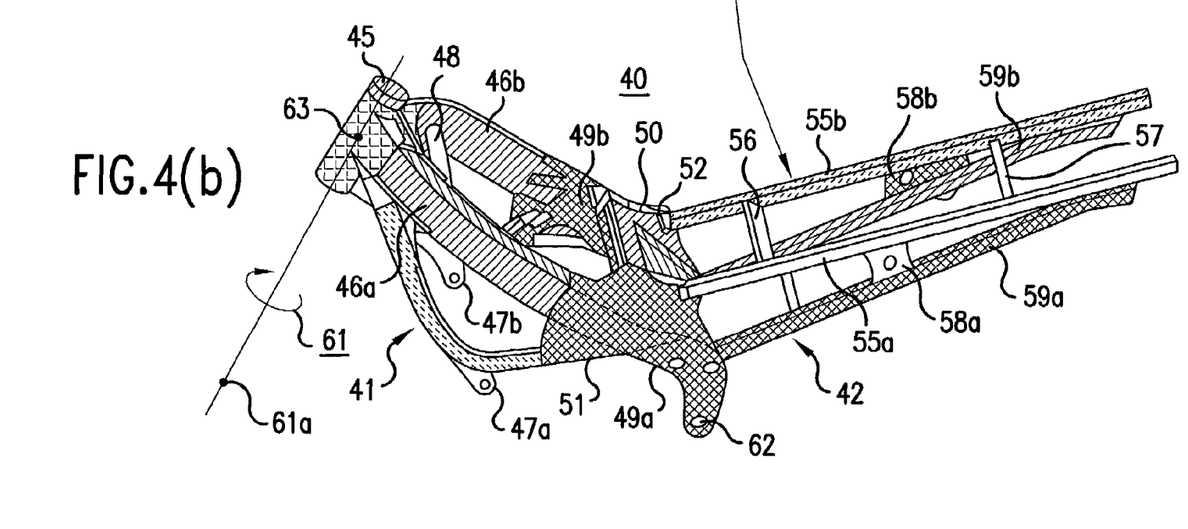

In FIG. 4(b), an axial line 61 of the head pipe is illustrated having an axle 61a of a front wheel and a pivot 62 from which a rear fork and a rear wheel are suspended.

Referring again to FIG. 1, the structure optimizing result displaying apparatus 10 includes an input unit 1, a calculation control unit 2 composed of a computer, a standard wall thickness database 3, a display unit 4, and a temporary memory and an ROM (not shown) for storing data containing a working area.

The input unit 1 includes an initial condition indicating unit 1a and an output form indicating unit 1b.

In the initial condition indicating unit 1a, three-dimensional shape data of a structure, the number of each component, the fact whether or not each component is to be analyzed, an initial value of a wall thickness of each component, a minimum value and a maximum value as limited values of the wall thickness of each component, a name of a material of each component, and a required rigidity value of the structure are indicated.

In the output form indicating unit 1b, either of display of a list of wall thickness values, the display of a list of rigidity values, and a comparative display of a three-dimensional shape and a display of a list of wall thickness values (which is also simply referred to as "comparative display") is indicated.

The calculation control unit 2 includes a sensitivity analyzing unit 2a, an optimum wall thickness value calculating unit 2b, a standard wall thickness selecting unit 2c, a structure analyzing unit 2d, and an output calculation/display control unit 2e. The sensitivity analyzing unit 2a performs sensitivity analysis using a finite element method on the basis of the initial input data indicated by the initial condition indicating unit 1a. The optimum wall thickness value calculating unit 2b calculates an actual rigidity value of the structure on the basis of the initial input data for each component, calculates an optimum value of a wall thickness of each component on the basis of the sensitivity analysis result obtained by the sensitivity analyzing unit 2a in order to make the actual rigidity value close to a target rigidity value of the structure, and stores the optimum value for each component in the temporary memory. The standard wall thickness value selecting unit 2c selects a standard wall thickness value closest to the optimum value of the wall thickness obtained by the optimum wall thickness value calculating unit 2b by referring to the standard wall thickness value of the standard wall thickness database 3 for each component, and stores the standard wall thickness value for each component in the temporary memory. The structure analyzing unit 2d calculates a rigidity value of the structure by structural analysis using the finite element method on the basis of each of the calculated optimum value of the wall thickness and the standard wall thickness value selected by the standard wall thickness value selecting unit 2c in place of the initial wall thickness value for each component, and stores the calculated rigidity value in the temporary memory. The output calculation/display control unit 2e performs calculation for display based on the output form indicated by the output form indicating unit 1b and performs display control for displaying the calculated result on the display unit 4.

Accordingly, the structure analyzing unit 2d calculates the rigidity value of the structure by using the calculated optimum value of the wall thickness of each component, and the rigidity value of the structure by using the selected standard value of the wall thickness of each component, and stores the calculated rigidity values in the temporary memory.

If the display of a list of wall thickness values is indicated as the output form in the output form indicating unit 1b, the output calculation/display control unit 2e calculates a difference between the initial wall thickness value and the optimum value of the wall thickness and a difference between the optimum value of the wall thickness and the standard value of the wall thickness for each component, and performs display control which makes the display unit 4 display the number (PNo.) of each component, the fact whether or not each component is to be analyzed, the minimum value (MIN) as the limited value of the wall thickness of each component, the initial wall thickness value of each component, the maximum value (MAX) as the limited value of the wall thickness of each component, the optimum value (OPT-T) of the wall thickness of each component, the difference (DIF-T) between the initial wall thickness value and the optimum value of the wall thickness for each component, the standard value (STD-T) of the wall thickness of each component, the difference (SDIF-T) between the optimum value of the wall thickness and the standard value of the wall thickness for each component, and a name of a material of each component.

If the difference between the optimum wall thickness value (OPT-T) for each component and the standard wall thickness value (STD-T) determined for an actual material of the component is out of a specific range, the optimum wall thickness value (OPT-T) may be used as the standard wall thickness value (STD-T). This is exemplified by each of PNos. 2102 to 2105 in FIG. 4(a). The reason for this is as follows. If the standard wall thickness values of a material of a component have three values of 1.0 mm, 1.5 mm, and 2.0 mm, and the optimum wall thickness value for the component is calculated as 1.2 mm, then it is reasonable that the value of 1.0 mm should be taken as the standard wall thickness value (STD-T). However, if the optimum wall thickness value is calculated as 0.2 mm or 9.0 mm, then the difference between the standard value of the material and the optimum wall thickness value becomes excessively large. In this case, it is apparent that the change in the structure should be superior to the change of the wall thickness of the component. Further, in this case, by using the optimum wall thickness value (OPT-T) as the standard wall thickness value (STD-T), it is possible to prevent an adverse effect of the partial unsuitable standard wall thickness value (STD-T) on the calculation of the rigidity of the entire structure.

If the display of a list of the rigidity values is indicated as the output form in the output form indicating unit 1b, the output calculation/display control unit 2e calculates a lateral rigidity value and a torsional rigidity value for the structure, a center position of the torsion on the basis of a position of the pivot 62 or a center 63 of the head pipe, a lateral displacement of an axle, and a weight for each of the initial wall thickness value of each component, the optimum wall thickness value of each component, and the standard wall thickness value of each component; and calculates, for each component, a difference between the rigidity value for the initial wall thickness value and the required rigidity value, a difference between the rigidity value for the optimum wall thickness value and the required rigidity value, a difference between the rigidity value for the standard wall thickness value and the required rigidity, a difference between the rigidity for the optimum wall thickness value and the rigidity for the standard wall thickness value, a difference between the rigidity for the initial wall thickness value and the rigidity value for the optimum wall thickness value, and a difference between the rigidity value for the initial wall thickness value and the rigidity value for the standard wall thickness value. The output calculation/display control unit 2e also performs the display control which makes the display unit 4 display the calculated results together with the required rigidity value.

If the comparative display of the display of a three-dimensional shape and a list of wall thickness values is indicated as the output form in the output form indicating unit 1b, the output calculation/display control unit 2e performs the display control which makes the display unit 4 display the list of wall thickness values on one side (upper side) of the display unit 4 and the three-dimensional shape of the structure on the other side (lower side) of the display unit 4. In this case, the output calculation/display control unit 2e performs such a display control that if a component located at a position on the displayed three-dimensional shape is indicated, then a line of the number PNo. of the same component in the list of the wall thicknesses is selectively indicated, and if a line of a component in the list of the wall thicknesses is indicated, then the position of the same component on the displayed three-dimensional shape is selectively indicated.

Figure 2:
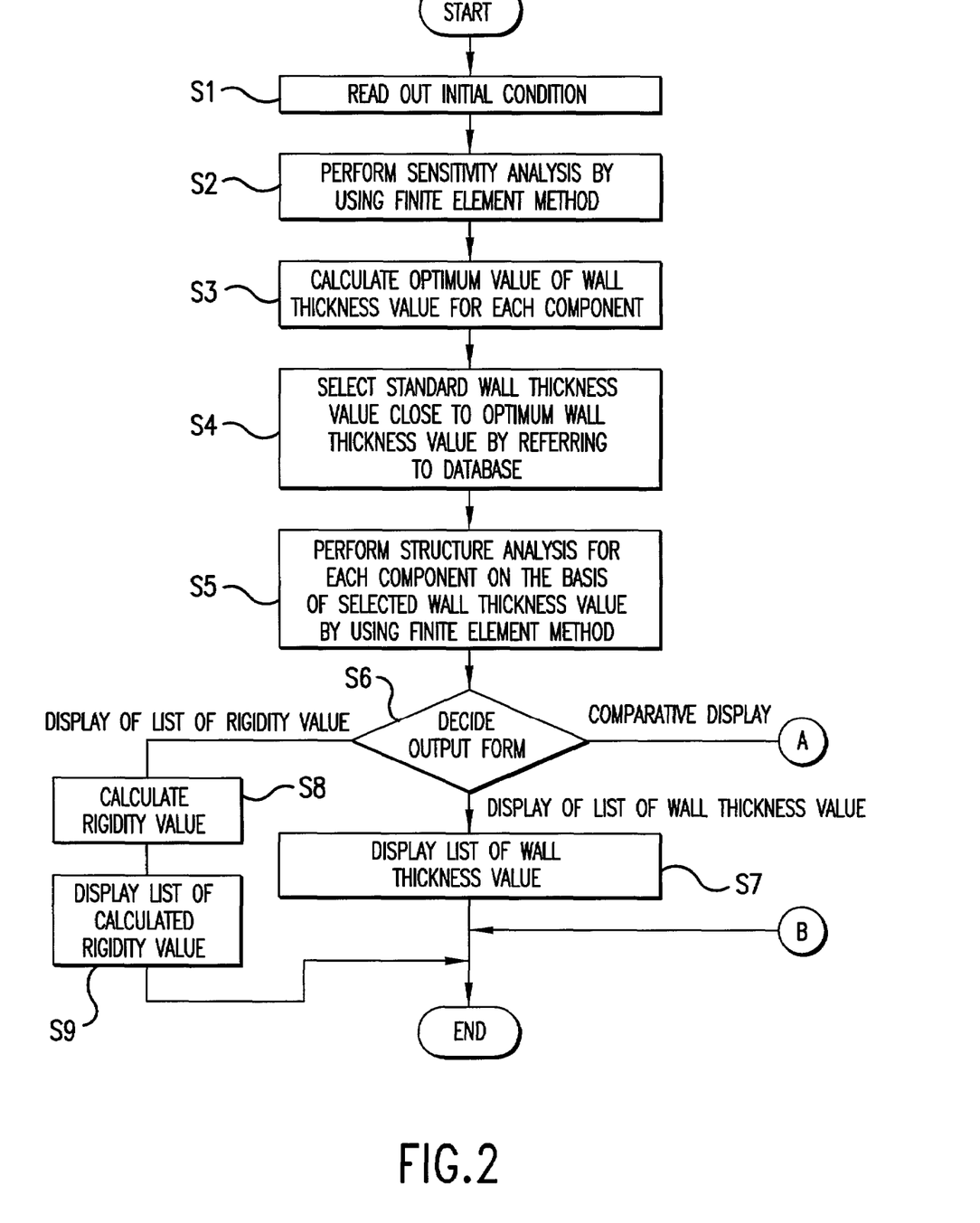
FIG. 2 is a flow chart illustrating an operation of the structure optimizing result displaying apparatus according to the embodiment of the present invention.
Figure 3:
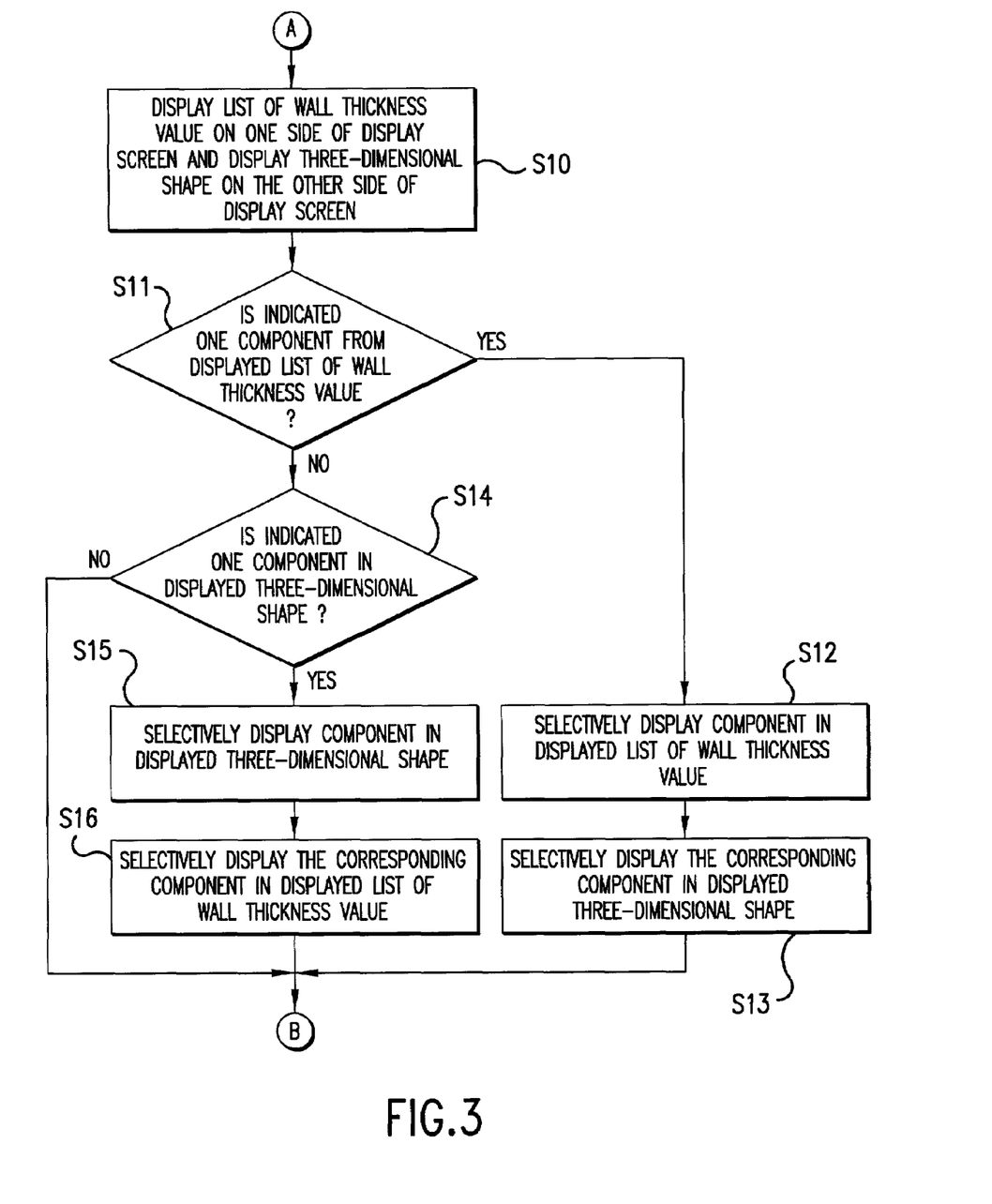
FIG. 3 is a flow chart illustrating the operation of the structure optimizing result displaying apparatus according to the embodiment of the present invention.

An operation of the structure optimizing result displaying apparatus 10 is configured as described above and will be described with reference to flow charts shown in FIGS. 2 and 3.

After the start of the operation of the structure optimizing result displaying unit 10, in step S1, three-dimensional shape data of a structure, the number (PNo.) of each component, the fact whether or not each component is to be analyzed, an initial value of a wall thickness of each component, a minimum value and a maximum value of a wall thickness of each component, a name of a material of each component are indicated by the initial condition indicating unit 1a and a required rigidity value of the structure is read out. Here, since the initial data thus inputted is of a predetermined value for the frame body 40, a rigidity value obtained by using these values is assumed to be close to a required rigidity value of the frame body 40 as a structure.

In step S2, sensitivity analysis using the finite element method is performed on the basis of the inputted initial data by the sensitivity analyzing unit 2a. In step S3, an actual rigidity value of the structure is calculated by a desirable combination of the conditions based on the sensitivity analysis result, and an optimum value of the wall thickness of each component is calculated by the optimum wall thickness value calculating unit 2b with the wall thickness of each component taken as a design variable and with a minimum superimposition taken as a target function in order to make the actual rigidity value close to the required rigidity value.

The optimum wall thickness value obtained in step S3 is a calculated value, and therefore, a member having the optimum wall thickness value thus calculated is not necessarily available. In step S4, a standard wall thickness value closest to the optimum wall thickness value is selected for each component by the standard wall thickness value selecting unit 2c by referring to standard wall thickness values of the material of each component stored in the standard wall thickness database 3.

In this case, if the structure is a steel frame structure of a building, there occurs no problem in selecting a wall thickness value closest to an optimum wall thickness value and larger than the optimum wall thickness value as a standard wall thickness value is taken in consideration of safety. However, in the case where the structure is the frame body 40 for a motorcycle, it may be undesirable that a rigidity value of the whole of the frame body 40 is excessively large or small. Since a steerability not only during the operation of the vehicle along a straight line but also during the operation along a curve line must be desirable, and more specifically, the degree of bending of the frame body 40 depends on forces applied to a front wheel and a rear wheel and the flexible side of the frame body 40 upon acceleration or deceleration must be taken into account, the standard wall thickness value closest to the optimum wall thickness is required to be selected.

In step S5, a structural analysis using the finite element method is performed on the basis of the optimum wall thickness value calculated for each component by the structure analyzing unit 2d, to obtain a rigidity value of the structure on the basis of the optimum wall thickness value of each component, and similarly, structure analysis using the finite element method is performed on the basis of the selected standard wall thickness value by the structure analyzing unit 2d, to obtain a rigidity value of the structure on the basis of the standard wall thickness value of each component.

In step S6, the output form inputted by the output form indicating unit 1b is read out, to decide the output form.

If it is decided in step S6 that the output form is the display of a list of wall thickness values, the process goes on to step S7. In step S7, for each component, a difference between the initial wall thickness value and the optimum wall thickness value and a difference between the optimum wall thickness value and the standard wall thickness value are calculated, and for each component, the number (PNo.) of the component, the fact whether or not the component is to be analyzed, the minimum wall thickness value, the initial wall thickness value, the maximum wall thickness value, the optimum wall thickness value, the difference between the initial wall thickness value and the optimum wall thickness value, the standard wall thickness value, the difference between the optimum wall thickness value and the standard wall thickness value, and the name of the material of each component, are displayed on the display unit 4 under the control of the output calculation/display control unit 2e. One example of this display of the list of wall thickness values is shown in FIG. 4(a). In FIG. 4(a), other components of PNos. subsequent to PNo. 2105 are displayed on the screen by scrolling of the screen.

In FIG. 4(a), character OPT designates whether or not a component is to be analyzed, wherein YES designates that a component is to be analyzed and NO designates that a component is not to be analyzed. MIN and MAX are the minimum value and the maximum value as the limited values of a wall thickness, respectively. OPT-T is an optimum wall thickness value. DIF-T is a difference between an initial wall thickness value and an optimum wall thickness value. STD-T is a standard wall thickness value and SDIF-T is a difference between an optimum wall thickness value and a standard wall thickness value.

According to the above displayed list of the wall thickness values, since a difference between the initial wall thickness value and the optimum wall thickness value is calculated for each component and the difference is displayed as a list for each component, it can be easily decided how much of a difference occurs at which component of the structure by the displayed list.

As a result, if the difference between the initial wall thickness value and the optimum wall thickness value is relatively small, it can be readily examined whether or not the change in wall thickness value of each component of the structure should be adopted, and if the number of components in each of which a difference occurs between the initial wall thickness value and the optimum wall thickness value is large or the difference between the initial wall thickness value and the optimum wall thickness value is relatively large, it can be readily examined whether or not the overall structure should be reviewed and/or a reinforcing member should be added.

According to the above displayed list of the wall thickness values, since the difference between the optimum wall thickness value and the standard wall thickness value is obtained for each component and the difference is displayed as a list for each component, it can be easily decided how much of a difference occurs for a component of the structure by the displayed list.

In the case of actually producing each component, a wall thickness value of the component optimized for realizing a desired rigidity balance may be often replaced with a standard wall thickness value of a material of the component, so that a difference occurs between the optimum value and the selected standard wall thickness value, with a result that the rigidity balance of the structure may be varied. In this case, according to the present invention, it can be easily decided how much of a change in rigidity balance occurs at which component of the structure.

Figure 5:
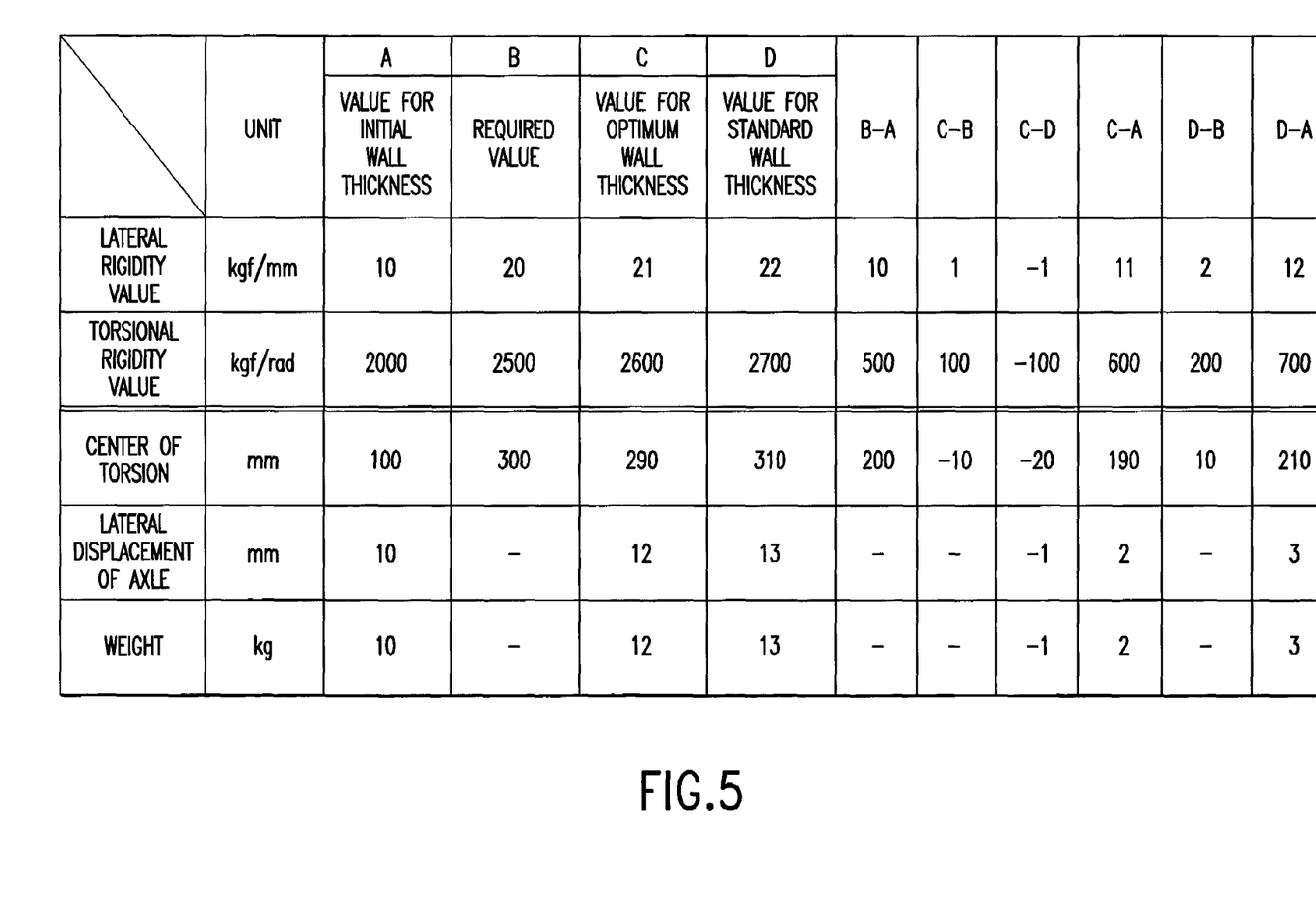
FIG. 5 shows one example of a displayed list of rigidity values obtained by the structure optimizing result displaying apparatus according to the embodiment of the present invention.

If it is decided in step S6 that the output form is the display of a list of rigidity values, the process goes on to step S8. In step S8, a lateral rigidity value and a torsional rigidity value for the structure, a center position of the torsion on the basis of the center 63 of the head pipe, a lateral displacement of an axle, and a weight are calculated for each of the initial wall thickness values of each component, the optimum wall thickness value of each component, and the standard wall thickness value of each component. Further, a difference between the rigidity value for the initial wall thickness value and the required rigidity value, a difference between the rigidity value for the optimum wall thickness value and the required rigidity value, a difference between the rigidity value for the standard wall thickness value and the required rigidity value, a difference between the rigidity value for the optimum wall thickness value and the rigidity value for the standard wall thickness value, a difference between the rigidity value for the initial wall thickness value and the rigidity value for the optimum wall thickness value, and a difference between the rigidity value for the initial wall thickness value and the rigidity value for the standard wall thickness value are calculated for each component. In step S9, the calculated results, that is, the lateral rigidity value, the torsional rigidity value, the center position of torsion, the lateral displacement of the axle, and the weight are displayed as a list together with the required rigidity value on the display unit 4 under the control of the output calculation/display control unit 2e. Part of one example of this display of a list of rigidity values is shown in FIG. 5.

According to the list of rigidity values, since the rigidity value of the structure on the basis of the initial wall thickness value of each component and the rigidity value of the structure on the basis of the optimum wall thickness value of each component are comparatively displayed as a list, the effect of a change from the initial wall thickness value to the optimum wall thickness value exerted on each rigidity value can be easily understood from the displayed list.

According to the list of rigidity values, from the difference between the rigidity value of the structure on the basis of the initial wall thickness value and the rigidity value of the structure on the basis of the optimum wall thickness value, it can be easily decided whether the wall thickness value of each component should be changed or the configuration of the structure should be changed.

According to the list of the rigidity values, since the rigidity value of the structure on the basis of the optimum wall thickness value of each component and the rigidity value of the structure on the basis of the standard wall thickness value are comparatively displayed as a list, the effect of a change from the optimum wall thickness value to the standard wall thickness value exerted on each rigidity value can be easily understood from the displayed list.

According to the list of the rigidity values, from the difference between the rigidity value of the structure on the basis of the optimum wall thickness value of each component and the rigidity value of the structure on the basis of the standard wall thickness value, it can be easily decided whether the wall thickness value of each component should be changed or the configuration of the structure should be changed.

The same is true for the difference between the rigidity value on the basis of the initial wall thickness value and the required rigidity value, the difference between the rigidity value on the basis of the optimum wall thickness value and the required value, the difference between the rigidity value on the basis of the standard wall thickness value and the required rigidity value, and the difference between the rigidity value on the basis of the optimum wall thickness value and the rigidity value on the basis of the standard wall thickness value.

If it is decided in step S6 that the output form is the comparative display of the display of a three-dimensional shape and the display of a list of wall thickness values, the process goes on to step S10. In step S10, the same list of wall thickness values as that in step S7 is displayed on one side, for example, an upper side of the display unit 4, and a three-dimensional shape of the structure based on the three-dimensional data is displayed on the other side, for example, on the lower side of the display unit 4.

In step S11, it is checked whether or not one component is indicated from the displayed list of wall thickness values. The indication in step S11 is performed by indicating one component in the displayed list of wall thickness values by a cursor.

If it is decided in step S11 that one component is indicated from the displayed list of wall thickness values, the process goes on to step S12. In step S12, the one component indicated from the displayed list of wall thickness values is selectively displayed. The selective display in step S12 is performed by increasing a display brightness of a line of the component indicated from the displayed list of wall thickness values or changing a display color of the line of the component indicated from the displayed list of wall thickness values.

In step S13, the component corresponding to the component indicated in step S12 is selectively displayed from the displayed three-dimensional shape. The selective display in step S13 is performed by increasing a display brightness of the selected component or changing a display color of the selected component.

If it is decided in step S11 that any component is not indicated from the displayed list of wall thickness values, the process goes on to step S14. In step S14, it is checked whether or not one component is indicated from the displayed three-dimensional shape. If it is decided in step S14 that one component is indicated from the displayed three-dimensional shape, the process goes on to step S15. In step S15, the component indicated from the displayed three-dimensional shape is selectively displayed. The selective display in step S15 is performed by increasing a display brightness of the selected component or changing a display color of the selected component.

In step S16, a line of the component corresponding to the component indicated in step S15 is selectively displayed from the displayed list of wall thickness values. The selective display in step S16 is performed by increasing a display brightness of the selected component or changing a display color of the selected component.

One example of the comparative display is shown in FIGS. 4(a) and 4(b). For example, if a line of a component number PNo. 2102 is indicated in FIG. 4(a), a part 55b as the corresponding component is selectively displayed in FIG. 4(b). Conversely, if the part 55b as a component is indicated in FIG. 4(b), the line of the number PNo. 2102 of the corresponding component is selectively displayed in FIG. 4(a).

As described above, in the case where the comparative display is selected as the output form, if a component in the displayed list of wall thickness values is indicated on the screen of the display unit 4, the indicated component is selectively displayed in the displayed three-dimensional shape of the structure on the screen of the display unit 4. Conversely, if a component in the three-dimensional shape of the structure is indicated on the screen of the display unit 4, the indicated component is selectively displayed from the displayed list of wall thickness values. As a result, even if the structure is complicated and the number of components of the structure is large, an arbitrary component can be easily confirmed for a displacement amount between before and after optimizing calculation by an operator.

As described above, according to the structure optimizing result displaying method and the structure optimizing result displaying apparatus according to the present invention, since the actual rigidity value and the rigidity value of the structure on the basis of the optimum wall thickness value of each of the components are comparatively displayed as a list, it can be easily appreciated, from the displayed list, to what degree the actual rigidity value is deviated from the rigidity value on the basis of the optimum wall thickness value.

According to the structure optimizing result displaying method and the structure optimizing result displaying apparatus according to the present invention, from the displayed list of a difference in the rigidity value between the actual rigidity value and the rigidity value of the structure on the basis of the optimum wall thickness value, it can be easily appreciated to what degree the actual rigidity value is deviated from the rigidity value on the basis of the optimum wall thickness value. As a result, it can be quickly decided whether a structure can be optimized only by changing a wall thickness of each component or by changing the configuration of the structure.

According to the structure optimizing result displaying method and the structure optimizing result displaying apparatus according to the present invention, since the rigidity value of the structure on the basis of the optimum wall thickness value and the rigidity value of the structure on the basis of the standard wall thickness value are comparatively displayed for each of the components as a list, it can be easily appreciated, from the displayed list, to what degree the rigidity value on the basis of the standard wall thickness value is deviated from the rigidity value on the basis of the optimum wall thickness value.

According to the structure optimizing result displaying method and the structure optimizing result displaying apparatus according to the present invention, since a difference in the rigidity value between the rigidity value of the structure on the basis of the optimum wall thickness value and the rigidity value of the structure on the basis of the standard wall thickness value is calculated and the difference in the rigidity value for each of the components is displayed as a list, it can be easily appreciated, from the displayed, list, to what degree the rigidity value on the basis of the standard wall thickness value is deviated from the rigidity value on the basis of the optimum wall thickness value. As a result, it can be quickly decided whether a structure can be optimized only by changing a wall thickness value of each component or by changing the configuration of the structure.

In addition to the description above, the method of and the apparatus for displaying a structure optimizing result according to the present invention exhibits the following additional effects. In the case of actually producing each component, an optimum wall thickness value of the component optimized for realizing a desired rigidity balance must be replaced with a standard wall thickness value of a material of the component. Accordingly, a difference occurs between the optimum wall thickness value and the standard wall thickness value, with a result that the rigidity balance of the structure is varied. According to the present invention, however, since a difference between an initial wall thickness value of each component of a structure and an optimum wall thickness value obtained by optimizing the calculation is displayed on one side of a display means as a list for each component, and a three-dimensional shape of the structure is displayed on the other side of the display means, if a component on one side (or the other side) of the display means is indicated, the corresponding component can be selectively displayed on the other side (or one side) of the display means.

Accordingly, from the display on the one side of the display means, it can be easily confirmed how much of a difference occurs for a component of the structure. If the component is indicated, the corresponding component can be displayed on the displayed three-dimensional shape of the structure on the other side of the display means. Conversely, if a component is indicated on the displayed three-dimensional shape of the structure on the other side of the display means, the corresponding component can be selectively displayed on the displayed list on the one side of the display means. As a result, the difference caused by replacing the optimum wall thickness value with the standard wall thickness value can be easily checked.

As described above, according to the structure optimizing result displaying method and the structure optimizing result displaying apparatus according to the present invention, since a difference in the value between the inputted initial wall thickness value and the optimum wall thickness value obtained by the optimizing calculation is displayed for each of the components as a list, it can be easily decided how much of a difference occurs for a component of the structure.

According to the structure optimizing result displaying method and the structure optimizing result displaying apparatus according to the present invention, since a difference in the value between the optimum wall thickness value optimized by the optimizing calculation and the selected standard wall thickness value is displayed for each of the components as a list, it can be easily decided how much of a difference between the optimum wall thickness value and the standard wall thickness value occurs at which component of the structure.

As a result, it can be readily examined whether or not the structure can be optimized by changing the wall thickness value of each component of the structure, and if the difference is relatively large, it can be readily examined whether or not the overall structure should be reviewed and/or a reinforcing member should be added.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure optimizing result displaying method for calculating an actual rigidity value of a structure on the basis of an inputted initial value of a wall thickness of each of two or more components of said structure, said method comprising the step of:

calculating, by using a computer, an optimum value of the wall thickness of each of said components on the basis of a sensitivity analysis result in order to make the calculated actual rigidity value close to a required rigidity value of said structure, and displaying the calculated result, calculating, by using a computer, a difference between the initial value and an optimum value of the wall thickness;

calculating, by using a computer, a difference between the optimum value and a standard value of the wall thickness;

concurrently displaying, by using a computer, each of said two or more components and associated data values in a row, said rows of said two or more components and the associated data values being arranged one above the other as a list, the data values in each row corresponding to each one of said components in the list including:
said initial value,
said optimum value,
the calculated difference between the initial value and the optimum value,
said standard value, and
the calculated difference between the optimum value and the standard value, and
further comprising the step of
displaying a designator indicating whether or not the associated component is to be analyzed,
based on the inputted initial value of the wall thickness of each of the two or more components of said structure, the method further comprising the steps of calculating and displaying a center of torsion corresponding to each of the respective components; and
wherein said structure is a vehicle body frame and said two or more components include a pivot and a head pipe with a center,
the method further comprising the steps of displaying the center of torsion corresponding to each pivot and the head pipe on a basis of a position of the pivot or the center of the head pipe.

2. The structure optimizing result displaying method according to claim 1, and further comprising the steps of:
calculating a difference between said actual rigidity value and said required rigidity value of said structure on the basis of said optimum wall thickness value of each of said components.

3. The structure optimizing result displaying method according to claim 1, wherein the designator indicating that the associated component is to be analyzed is YES, and the designator indicating that the associated component is not to be analyzed is NO.

4. The structure optimizing result displaying method according to claim 1, wherein the component in each of the rows is independent of the components in each of the other rows.

5. The structure optimizing result displaying method according to claim 1, wherein the data values corresponding to each of the components include a lateral rigidity value, a torsional rigidity value, the center of torsion, a lateral displacement, and a weight.

6. A structure optimizing result displaying method for calculating an actual rigidity value of a structure on the basis of an inputted initial value of a wall thickness of each of components of said structure, said method comprising the step of:
calculating, by using a computer, an optimum value of the wall thickness of each of said components on the basis of a sensitivity analysis result in order to make the calculated actual rigidity value close to a required rigidity value of said structure, and displaying the calculated result,
selecting, by using a computer, a standard wall thickness value corresponding to said optimum wall thickness value optimized by said optimizing calculation for each of said components;
setting, by using a computer, said wall thickness value of each of said components of said structure to said selected standard wall thickness value,
calculating, by using a computer, a rigidity value of said structure on the basis of said selected standard wall thickness value;
calculating, by using a computer, a difference between the initial value and an optimum value of the wall thickness;
calculating, by using a computer, a difference between the optimum value and the standard value of the wall thickness; and
concurrently displaying, by using a computer, each of said components and associated data values in a row, said rows of said components and the associated data values being arranged one above the other as a list, the data values in each row corresponding to each one of said components in the list including:
said initial value,
said optimum value,
the calculated difference between the initial value and the optimum value,
said standard value, and
the calculated difference between the optimum value and the standard value, and
further comprising the step of:
displaying a designator indicating whether or not the associated component is to be analyzed,
based on the inputted initial value of the wall thickness of each of the two or more components of said structure, the method further comprising the steps of calculating and displaying a center of torsion corresponding to each of the respective components; and
wherein said structure is a vehicle body frame and said two or more components include a pivot and a head pipe with a center,
the method further comprising the steps of displaying the center of torsion corresponding to each pivot and the head pipe on a basis of a position of the pivot or the center of the head pipe.

7. The structure optimizing result displaying method according to claim 6, and further comprising the steps of:
calculating a difference between said required rigidity value of said structure on the basis of said optimum wall thickness value and said actual rigidity value of said structure on the basis of said standard wall thickness value.

8. The structure optimizing result displaying method according to claim 6, wherein the designator indicating that the associated component is to be analyzed is YES, and the designator indicating that the associated component is not to be analyzed is NO.

9. The structure optimizing result displaying method according to claim 6, wherein the component in each of the rows is independent of the components in each of the other rows.

10. The structure optimizing result displaying method according to claim 6, wherein the data values corresponding to each of the components include a lateral rigidity value, a torsional rigidity value, the center of torsion, a lateral displacement, and a weight.

11. A structure optimizing result displaying apparatus comprising:
optimizing calculation means for calculating an actual rigidity value of a structure on the basis of an inputted initial value of a wall thickness of each of components of said structure, and calculating an optimum value, of the wall thickness of each of said components on the basis of a sensitivity analysis result in order to make the calculated actual rigidity value close to a required rigidity value of said structure, wherein the calculated result is displayed; and display control means for concurrently displaying each of said components and associated data values in a row, said components and the associated data values being arranged one above the other as a list, rigidity value changed amount calculating means for calculating a difference between the initial value and an optimum value of the wall thickness; and calculating a difference between the optimum value and a standard value of the wall thickness, the data values in each row corresponding to each of said components in the list including:
said initial value,
said optimum value,
the calculated difference between the initial value and the optimum value,
said standard value, and
the calculated difference between the optimum value and the standard value based on the standard wall thickness,
wherein the display control means is adapted to display a designator indicating whether or not the associated component is to be analyzed,
based on the inputted initial value of the wall thickness of each of the two or more components of said structure, the apparatus is further adapted to calculate and display a center of torsion corresponding to each of the respective components; and wherein said structure is a vehicle body frame and said two or more components include a pivot and a head pipe with a center, the method further comprising the steps of displaying the center of torsion corresponding to each pivot and the head pipe on a basis of a position of the pivot or the center of the head pipe.

12. The structure optimizing result displaying apparatus according to claim 11, and further comprising:
rigidity value changed amount calculating means for calculating a difference between said actual rigidity value and said required rigidity value of said structure on the basis of said optimum wall thickness value of each of said components.

13. The structure optimizing result displaying apparatus according to claim 11, wherein the designator indicating that the associated component is to be analyzed is YES, and the designator indicating that the associated component is not to be analyzed is NO.

14. The structure optimizing result displaying apparatus according to claim 11, wherein the component in each of the rows is independent of the components in each of the other rows.

15. The structure optimizing result displaying apparatus according to claim 11, wherein the data values corresponding to each of the components include a lateral rigidity value, a torsional rigidity value, the center of torsion, a lateral displacement, and a weight.

16. A structure optimizing result displaying apparatus comprising:
optimizing calculation means for calculating an actual rigidity value of a structure on the basis of an inputted initial value of a wall thickness of each of components of said structure; calculating an optimum value of the wall thickness value of each of said components on the basis of a sensitivity analysis result in order to make the calculated actual rigidity value close to a required rigidity value of said structure, wherein the calculated result is displayed selecting means for selecting a standard wall thickness value corresponding to said optimum wall thickness value optimized by said optimizing calculation means for each of said components;

calculating means for setting said wall thickness value of each of said components of said structure to said standard wall thickness value selected by said selecting means and calculating a rigidity value of said structure on the basis of said selected standard wall thickness value; calculating a difference between the initial value and an optimum value of the wall thickness; and calculating a difference between the optimum value and a standard value of the wall thickness; and display control means for concurrently displaying each of said components and associated data values in a row, said components and the associated data values being arranged one above the other as a list, the data values in each row corresponding to each one of said components in the list including:
said initial value,
said optimum value,
the calculated difference between the initial value and the optimum value,
said standard value, and
the calculated difference between the optimum value and the standard value based on the standard wall thickness,
wherein the display control means is adapted to display a designator indicating whether or not the associated component is to be analyzed,
based on the inputted initial value of the wall thickness of each of the two or more components of said structure, the apparatus is further adapted to calculate and display a center of torsion corresponding to each of the respective components; and wherein said structure is a vehicle body frame and said two or more components include a pivot and a head pipe with a center, the method further comprising the steps of displaying the center of torsion corresponding to each pivot and the head pipe on a basis of a position of the pivot or the center of the head pipe.

17. The structure optimizing result displaying apparatus according to claim 16, and further comprising:
difference rigidity value calculating means for calculating a difference between said required value of said structure on the basis of said optimum wall thickness value, and said standard rigidity value of said structure on the basis of said standard wall thickness value.

18. The structure optimizing result displaying apparatus according to claim 16, wherein the designator indicating that the associated component is to be analyzed is YES, and the designator indicating that the associated component is not to be analyzed is NO.

19. The structure optimizing result displaying apparatus according to claim 16, wherein the data values corresponding to each of the components include a lateral rigidity value, a torsional rigidity value, the center of torsion, a lateral displacement, and a weight.

20. A structure optimizing result displaying apparatus comprising:
optimizing calculation means for calculating an actual rigidity, value of a structure on the basis of an inputted initial value of a wall thickness of each component of said structure, and calculating an optimum value of the wall thickness of each of said components on the basis of a sensitivity analysis result in order to make the calculated actual rigidity value close to a required rigidity value of the structure, wherein the calculated result is displayed;

selecting means for selecting a standard wall thickness value corresponding to said optimum wall thickness value for each of said components;

difference calculating means for calculating
- a difference in a value between said initial wall thickness value and said optimum wall thickness value obtained by said optimizing calculation using said optimizing calculating means for each of said components, and
- a difference in value between said optimum wall thickness value and said standard wall thickness value selected by said selecting means for each of said components; and display control means for concurrently displaying each of said components and associated data values in a row, said components and the associated data values being arranged one above the other as a list, the data values in each row corresponding to each one of said components in the list including:
- said initial wall thickness value,
- said optimum wall thickness value,
- the calculated difference between the initial wall thickness value and the optimum wall thickness value,
- said standard wall thickness value, and
- the calculated difference between the optimum wall thickness value and the standard wall thickness value, and
- in addition to the data values, each of the rows also includes a designator indicating whether or not the associated component is to be analyzed, based on the inputted initial value of the wall thickness of each of the two or more components of said structure, the apparatus is further adapted to calculate and display a center of torsion corresponding to each of the respective components; and wherein said structure is a vehicle body frame and said two or more components include a pivot and a head pipe with a center, the method further comprising the steps of displaying the center of torsion corresponding to each pivot and the head pipe on a basis of a position of the pivot or the center of the head pipe.

21. The structure optimizing result displaying apparatus according claim 20, wherein the data values corresponding to each of the components include a lateral rigidity value, a torsional rigidity value, the center of torsion, a lateral displacement, and a weight.

* * * * *